United States Patent
Bernabeu-Aubon et al.

(10) Patent No.: US 7,730,522 B2
(45) Date of Patent: Jun. 1, 2010

(54) SELF-REGISTERING OBJECTS FOR AN IPC MECHANISM

(75) Inventors: Jose M. Bernabeu-Aubon, Sammamish, WA (US); Jeff L. Havens, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1149 days.

(21) Appl. No.: 11/130,301

(22) Filed: May 16, 2005

(65) Prior Publication Data

US 2006/0259488 A1 Nov. 16, 2006

(51) Int. Cl.
*G06F 15/16* (2006.01)
*H04L 29/06* (2006.01)

(52) U.S. Cl. .......................... 726/4; 719/315; 719/316; 719/330; 726/2; 726/30; 709/215; 713/164

(58) Field of Classification Search .................. 707/9; 713/164–167, 194; 726/1–30; 719/330, 719/312; 709/215
See application file for complete search history.

(56) References Cited

U.S. PATENT DOCUMENTS

| | | | |
|---|---|---|---|
| 5,446,901 A * | 8/1995 | Owicki et al. ............... | 711/154 |
| 5,802,590 A * | 9/1998 | Draves ....................... | 711/164 |
| 5,907,675 A | 5/1999 | Aahlad | |
| 5,956,509 A | 9/1999 | Kevner | |
| 6,119,115 A | 9/2000 | Barr | |
| 6,138,251 A | 10/2000 | Murphy et al. | |
| 6,289,390 B1 | 9/2001 | Kavner | |
| 6,338,063 B1 | 1/2002 | Barr | |
| 6,381,628 B1 | 4/2002 | Hunt | |
| 6,381,653 B1 | 4/2002 | Feray et al. | |
| 6,418,464 B1 | 7/2002 | Minow | |
| 7,043,733 B2 | 5/2006 | Limprecht et al. | |
| 7,043,734 B2 | 5/2006 | Limprecht et al. | |
| 7,062,770 B2 | 6/2006 | Limprecht et al. | |
| 7,076,784 B1 | 7/2006 | Russell et al. | |
| 7,171,672 B2 | 1/2007 | Just | |
| 7,233,972 B2 | 6/2007 | Minow | |
| 7,237,237 B2 | 6/2007 | Foti | |

(Continued)

FOREIGN PATENT DOCUMENTS

WO   WO 2006/125003   11/2006

(Continued)

OTHER PUBLICATIONS

Mitchell, J.G. et al., "An Overview of the Spring System", Compcon: Digest of Technical Papers, 1994, 39, 122-131.*

(Continued)

*Primary Examiner*—Taghi T Arani
*Assistant Examiner*—Thaddeus Plecha
(74) *Attorney, Agent, or Firm*—Woodcock Washburn LLP

(57) ABSTRACT

In response to receiving a communication from a first process directed to a second process, a trusted entity determines if an object reference in the communication refers to an object owned by a first process which is being exported to a second process or if the communication refers to an object not owned by the first process which is being passed to the second process. The trusted entity generates a second object reference for use by the second process. Use of a naming convention identifies the reference as a reference to an object which is foreign to or owned by the processes.

17 Claims, 5 Drawing Sheets

U.S. PATENT DOCUMENTS

| | | | |
|---|---|---|---|
| 7,325,240 | B2 | 1/2008 | Yamamoto et al. |
| 7,379,460 | B2 | 5/2008 | Balakrishnan |
| 7,386,859 | B2 | 6/2008 | Sandadi et al. |
| 7,434,228 | B2 | 10/2008 | Bernabeu-Auban et al. |
| 7,434,235 | B2 | 10/2008 | Bernabeu-Auban et al. |
| 7,441,252 | B2 | 10/2008 | Li et al. |
| 7,581,232 | B2 | 8/2009 | Bernabeu-Auban et al. |
| 7,607,142 | B2 | 10/2009 | Bernabeu-Auban et al. |
| 2004/0064721 | A1* | 4/2004 | Murching et al. ........... 713/200 |
| 2004/0205771 | A1 | 10/2004 | Sudarshan et al. |
| 2005/0091214 | A1* | 4/2005 | Probert et al. .................. 707/9 |
| 2005/0193392 | A1 | 9/2005 | Carusi et al. |
| 2006/0259541 | A1 | 11/2006 | Bernabeu-Auban et al. |

FOREIGN PATENT DOCUMENTS

| | | |
|---|---|---|
| WO | WO 2006/125004 | 11/2006 |

OTHER PUBLICATIONS

Mitchell, J.G. et al., "An Overview of the Spring System", *Compcon: Digest of Technical Papers*, 1994, 39, 122-131.

Bevan, D., "An efficient reference counting solution to the distributed garbage collection problem," *Parrallel Computing*, 1989, 9, 179-192.

United States Patent and Trademark Office: Non-Final Office Action dated Jun. 24, 2008, U.S. Appl. No. 11/130,308.

United States Patent and Trademark Office: Final Office Action dated Jan. 7, 2009, U.S. Appl. No. 11/130,308.

United States Patent and Trademark Office: Notice of Allowance dated May 29, 2009, U.S. Appl. No. 11/130,308.

PCT International Preliminary Report on Patentability issued Mar. 10, 2009, in corresponding International Application No. PCT/US2006/019090.

PCT International Search Report mailed Jun. 20, 2008, in corresponding International Application No. PCT/US2006/019090.

United States Patent and Trademark Office: Non-Final Office Action dated Dec. 31, 2007, U.S. Appl. No. 11/129,847.

United States Patent and Trademark Office: Notice of Allowance dated Aug. 1, 2008, U.S. Appl. No. 11/129,847.

United States Patent and Trademark Office: Non-Final Office Action dated Aug. 11, 2008, U.S. Appl. No. 11/129,848.

United States Patent and Trademark Office: Final Office Action dated Mar. 17, 2009, U.S. Appl. No. 11/129,848.

United States Patent and Trademark Office: Notice of Allowance dated Aug. 21, 2009, U.S. Appl. No. 11/129,848.

PCT International Preliminary Report on Patentability issued Mar. 10, 2009, in corresponding International Application No. PCT/US2006/019092.

PCT International Search Report mailed Jul. 3, 2008, in corresponding International Application No. PCT/US2006/019092.

United States Patent and Trademark Office: Non-Final Office Action dated Dec. 31, 2007, U.S. Appl. No. 11/130,293.

United States Patent and Trademark Office: Notice of Allowance dated Jul. 10, 2008, U.S. Appl. No. 11/130,293.

United States Patent and Trademark Office: Non-Final Office Action dated Sep. 3, 2008, U.S. Appl. No. 11/130,300.

United States Patent and Trademark Office: Final Office Action dated May 29, 2009, U.S. Appl. No. 11/130,300.

\* cited by examiner

SELF-REGISTERING OBJECTS FOR AN IPC MECHANISM

CROSS-REFERENCE TO RELATED CASES

This application is related in subject matter to U.S. patent application Ser. No. 11/130,308 entitled "Coordinating Reference Counting Between Entities Executing Within Separate Address Spaces" filed herewith, U.S. patent application Ser. No. 11/129,848 entitled "A Cancellation Mechanism for Cooperative Systems" filed herewith, U.S. patent application Ser. No. 11/130,293 entitled "Type Server Caching the Proxy/Stub Generation" filed herewith, U.S. patent application Ser. No. 11/129,847 entitled "Structuring an Operating System Using a Service Architecture" filed herewith and U.S. patent application Ser. No. 11/130,300 entitled "Coordination of Set Enumeration Information Between Independent Agents" filed herewith.

FIELD OF THE INVENTION

The invention relates to communications between processes in computers and in particular to a mechanism for self-registering objects.

BACKGROUND OF THE INVENTION

A standard way to communicate between two processes A and B (running on the same machine or running on different machines) is to send a message. Often, for example, it is desirable to enable process A to send a message to process B asking process B to execute code on behalf of process A. Typically, process A must have knowledge of a port or contact point for process B in order to do this.

One way to enable process A to call process B is via a remote procedure call (RPC). A remote procedure call enables a process on one computer to cause code to be executed in another process on the same or on a different computer, without requiring explicit code to be written by a developer or programmer to perform that particular call. An RPC is initiated by the caller process (client) sending a request message to a remote system or second process (server) to execute a certain procedure using supplied arguments. A result message is returned to the caller. For example, in a remote procedure call, a function call may be made by process A, in which the name of the procedure that process B is to execute on behalf of process A and a set of parameters for the procedure, are specified. Process B executes the code and returns a message to process A. When the code in question is written using principles of object-oriented programming, RPC is sometimes referred to as remote invocation or remote method invocation.

A remote procedure call typically follows a particular protocol (another way of saying this is "it uses a particular interface") so that potentially unrelated processes can communicate. The protocol or interface define the methods and the values which the processes agree upon in order to cooperate.

The procedure of transforming the function call into a message is called marshalling. Marshalling may include gathering data from one or more applications or non-contiguous sources in computer storage, putting the data pieces into a message buffer, and organizing or converting the data into a format that is prescribed for a particular receiver or programming interface. Marshalling typically converts what the code in process A sees as a function call into a message to be sent to process B. The message typically includes the name of the function and a set of parameters, coded in a way that process B understands. Process B receives the message and has to transform the message into a call to process B's internal function. The process of converting a message into a function call is called unmarshalling. The piece of code that performs marshalling in process A is called a proxy and typically resides in the client process. The corresponding piece of code on the server side that performs unmarshalling is called a stub.

Within the context of object oriented programming, process A and process B can be viewed as objects encapsulating data and functions. Some well-known technologies that take this approach are Sun Microsystem's JAVA and Microsoft's COM and DCOM. That is, process B may be viewed as a container for one or multiple objects, whose methods are the functions invoked by process A. In object oriented systems, therefore, process A invokes a method of a particular object of process B instead of invoking a function in process B. To do this, process A must have some way of identifying the object in process B that process A wishes to invoke.

The data stored in process A which enables process A to identify the object of process B is known as a reference to the object. The reference stores information concerning how to locate the object: that is, the reference must be sufficient to identify the process and within the process to identify the object whose method is to be invoked.

One problem with such an approach is the possibility that a reference to an object will be fabricated or forged: that is, the system should guarantee that only the process intended to receive a reference receives the reference and that a reference cannot be deduced and used by a process that is not supposed to have the reference. It would be helpful if such a mechanism were available. Ideally, the mechanism should be performant and easy for a developer to program.

SUMMARY OF THE INVENTION

A trusted entity mediates all resource access and resource reference communications between processes, agents or services. An inter-process communication comprises the invocation of a method on an object via one of its references: the invocation can carry object references within its parameters, thus making it possible to propagate object references between processes, agents or services by the use of the IPC mechanism itself. The trusted entity maintains a namespace for each process/agent/service in which every external and internal resource reference of the process/agent/service is uniquely identified by a reference name. Because the trusted entity has sole access to the namespace, it is impossible for references to be forged. For each reference a first process/agent/service sends to a second process/agent/service, the trusted entity determines the resource owner. If the resource is not owned by the first process, the trusted entity translates the local reference name used by the first process to refer to the resource to the reference name used by the resource owner. The trusted entity generates a new local reference name for the second process and associates with the new local reference name the reference name used by the resource owner. This information is stored in the namespace for the second process.

If the resource is owned by the first process, the trusted entity determines the reference name used by the first process to refer to the resource and associates that reference name with a new local reference name for the resource for the second process. A process signals its intention to make a resource available to another process by sending a communication to the second process in which a reference to the resource is passed to the second process. Registration of a resource is only required when a process makes a resource available to another process (referred to herein as "exporting a reference"). The trusted entity detects the exportation of a reference by monitoring communications between processes. The trusted entity determines if a reference is being exported by inspection of the reference name itself. Foreign reference names are distinguishable from references to resources owned by a process by use of a naming convention.

The namespace may be maintained by the trusted entity as a table for each process. The table maintained for a process by the trusted entity may be solely accessible to the trusted entity and may be used by the trusted entity to resolve references to objects so that processes cannot directly access objects in other processes. The table for a process may include entries for references passed to the process and for references the process has exported. The table may be indexed by reference name. Alternatively, the index into the table may be used as the reference name. The index into the table for the object reference may identify the object reference as a reference passed to the process or as a reference the process has exported. The index into the table for the object reference may be used as the reference name for that process. If the trusted entity determines that an object reference is to be exported from a first process to a second process, the trusted entity may create an entry for the object reference in the table the trusted entity maintains for the first process. The index may be an even number to identify the reference as one exported by the owner process or may follow some other naming convention that identifies the reference as an exported reference. The index itself may be used as the reference name assigned to the reference by the trusted entity. The trusted entity may generate a new reference name for use by the second process. The trusted entity may create an entry in the table the trusted entity maintains for the second process, in which the reference name is an odd number to identify the object as an object that has been passed to the second process from another process. Alternatively, the trusted entity may generate a new reference name identifying the reference as one passed to the second process from another process by following some other naming convention.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
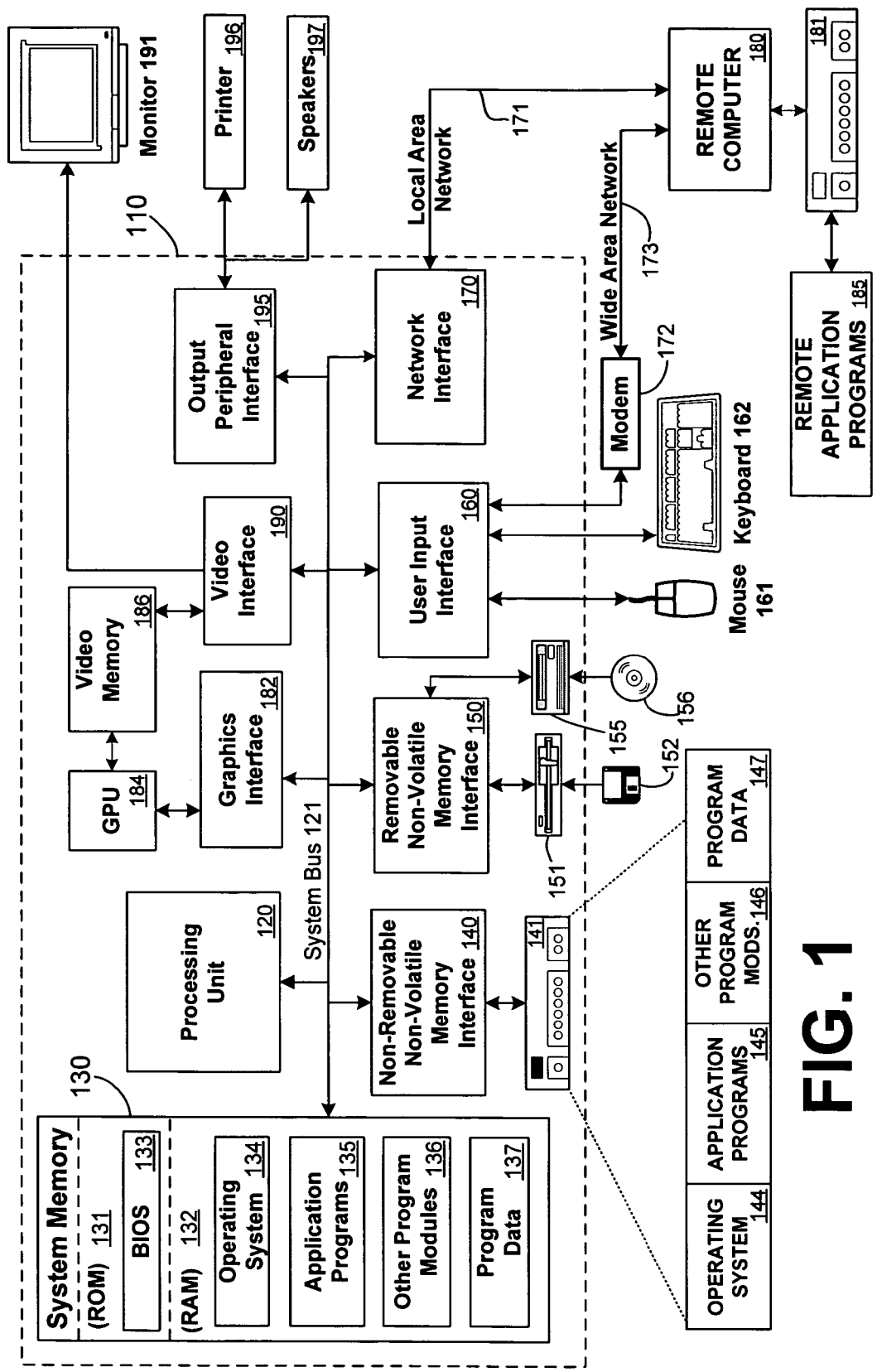
FIG. 1 is a block diagram showing an exemplary computing environment in which aspects of the invention may be implemented.

Inter-process communication (IPC) is the exchange of data between one process and another, either within the same computer or over a network. It implies a protocol that guarantees a response to a request. Examples are Unix sockets, RISC OS's messages, Mach ports, OS/2's named pipes, Microsoft Windows' DDE, Novell's SPX, Apple Macintosh's IAC (particularly AppleEvents) and different forms of software componentry (CORBA, Component Object Model (COM), Distributed Component Object Model (DCOM) and so on). With some systems, it may be possible for one process to fabricate or forge a reference to an object within another process.

For example, suppose that the protocol TCP/IP is used to communicate between process A on computer 1 and process B on computer 2. Suppose that process B listens on port number 1015 for incoming messages. In a direct, unmediated communication between process A and process B, process A merely has to specify the port number and object number within process B to access process B's object. Suppose that process B has a table in which is stored all process B's objects and that the table is indexed by the position that the object holds in the table. Thus, position one in the table may point to object 1, position 2 may point to object 2 and so on. In order to locate one of process B's objects, process A only needs process B's port number and the position of the object in the table. Hence, a reference to any object in process B could be easily fabricated by process A, as long as process A knows what port number process B is listening for incoming invocations. The fabrication of references just described is difficult or impossible to prevent.

To avoid these and other problems associated with communications between processes, a trusted entity having a trusted channel to every other process is often employed to mediate communications between processes. Using this approach, a process that exports one of its resources has to register its reference with the trusted entity. For example, a trusted entity may create a table for each of the processes in which in each one of the positions of the table, the trusted entity stores contact information for the objects of the process. Thus, in order for process A to contact process B, process A may send a message to the trusted entity, requesting access to an object in process B via a reference which is an index into the table maintained by the trusted entity for process B. The table maintained by the trusted entity for process B would need to store enough information to access the object in process B.

Typically, the way the trusted entity gets the information it requires to access the object in process B is by registration. For example, if process B wants to make one of its objects, say object 1, available for use by another process, process B may directly invoke the trusted entity, and request the trusted entity to register object 1. Process B may pass the trusted entity the address of object 1. The trusted entity stores this information in a table that it maintains for process B and passes process B an index into the table where the trusted entity stores the information required to access object 1. When process B wants to make object 1 accessible to process A, process B passes the index of object 1 to process A. Process A passes this index to the trusted entity to access object 1.

Registration of objects is a costly operation, both in terms of system resources and programmer burden. In accordance with some embodiments of the invention, registration of objects is eliminated, as described more fully below.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Self-Registration of Objects

Figure 2:
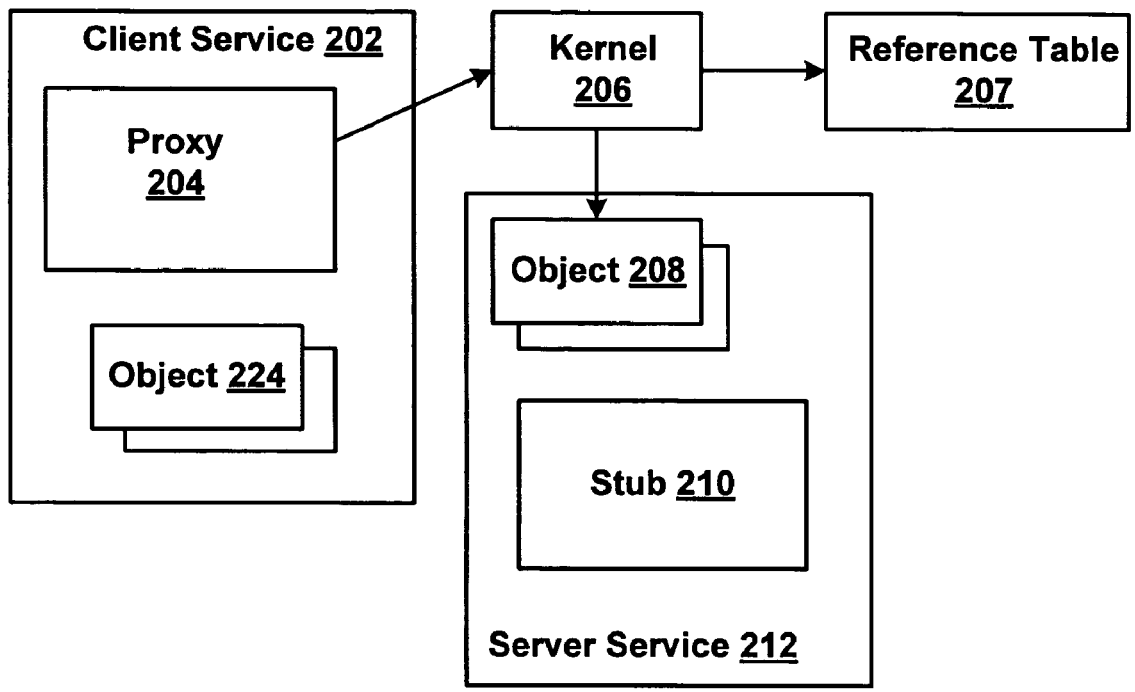
FIG. 2 is a block diagram illustrating relationships between services in an exemplary service-based operating system in accordance with one embodiment of the invention.

FIG. 2 is a block diagram illustrating the relationship of services in a service-based operating system in accordance with some embodiments of the invention. The operating system or portions thereof may reside on or may access one or more computers such as computer 110 described with respect to FIG. 1.

In some embodiments of the invention, the operating system includes entities that are processes, agents, services, components or modules comprising containers for objects or resources that are described through interfaces. FIG. 2 illustrates an exemplary "client" service 202 and an exemplary "server" service 212, although it will be appreciated that any number of client services and server services may exist in the operating system. Moreover, a "client" service in one interaction may act as a "server" service in another: that is, "client" and "server" terminology refers to roles within a particular interaction rather than to intrinsic differences in hardware, software, and so on. Each service may be implemented through the use of one or more objects. For example, in FIG. 2, the client service 202 includes a proxy object 204. The client service 202 may also include one or more other objects or resources, as represented by object 224. Similarly, the server service 212 may include a stub 210 and one or more objects, as represented by object 208. A service may require support from one or more other services and the code specifying the service may require the loading of specific run-time support to run correctly. Services may reside in the same address space in the local machine or in a computer of a computer network. Services alternatively may reside in different address spaces in the local machine or on different computers of a computer network.

A trusted entity may be viewed as a unique distinctive process, module, component, agent or service that mediates communications between processes in the system. In some embodiments the trusted entity is able to distinguish between data parameters and reference parameters in messages passed between processes. In some embodiments the trusted entity has a trusted channel to every agent, service, module, component or process for mediating resource access and reference. Communications with the trusted entity therefore are secure, meaning that processes other than the trusted entity are unable to access or modify transmissions or messages sent between processes. Moreover, the trusted entity may be capable of identifying the originator of a message.

In some embodiments of the invention, the trusted entity is the kernel 206. The kernel 206 can implement and expose its objects (not shown) to other services, such as to services 202 and 212 in FIG. 2. In some embodiments of the invention, the kernel 206 is trusted code. In some embodiments of the invention, the only trusted code is the kernel 206. In some embodiments, to avoid forgery of object references, only trusted code is able to manipulate an object reference. Hence in some embodiments of the invention, only the kernel 206 is able to manipulate an object reference. A service that holds a reference to an object refers to the reference by a representation referred to herein as a reference or as a local reference id. In some embodiments of the invention, the local reference id is understood only by the kernel 206. Hence, for example, a communication sent by client service 202 to a server service 212 invoking a method of object 208 would be mediated by kernel 206. Kernel 206 in some embodiments of the invention, creates and maintains one or more reference tables, as represented by reference table 207 in FIG. 2, to resolve the object reference received from client service 202 to the address of an object 208 to be invoked.

A service may communicate with another service by sending a method invocation to another object via an object reference (e.g., via a remote call). All communications among services are assumed to be and are treated as though they are remote. The client and server services may be in separate (remote) containers or may be co-located in the same container but in either case, the semantics of the call is remote.

A service interface may be specified in an interface definition language or via a contract. In some embodiments of the invention, a subset of an existing language, such as but not limited to C#, is used to define the contract. In some embodiments of the invention, a subset of the application implementation language, such as but not limited to C#, is used to define the interfaces. A service written in C# therefore will seamlessly integrate with the C# contract without requiring the mapping necessitated in traditional systems which use an IDL language for contracts. Services written in other languages such as for example, unmanaged C++ may have a translation table which maps constructs from the C# interface to constructs in C++. Resultant C++ services can interoperate with the C# service as long as the system service model and interface definitions are not violated.

Services may be mapped in a one to one relation to an address space. If such is the case, protection ensues as a consequence of the address space provided by the memory management unit. Alternatively, in some embodiments, multiple services can be located within the same address space. In this case, protection is obtained by a managed code run-time (such as, for example, Microsoft's CLR or Common Language Runtime). Services communicate with each other independent of their location.

Failure and security boundaries in the system may exist at the service level and may be reinforced by hardware protection at the address space and machine levels. Service recovery actions including the ability to restart, and dependency tracking are provided by the operating system. Optimizations may accrue for services that are located within the same address space.

A method invocation can only be interpreted by the receiving object. The receiving object decides what action or actions are to be taken, based on the information passed with the invocation. The information passed may include specific data structures and/or references the invoker passes to the object being invoked.

The set of invocations an object accepts through a particular reference and the way the object is supposed to react to such an invocation is referred to as the interface supported by the object through that reference. Hence, the kernel will not necessarily know what the particular interface implemented by a referenced object is and does not need access to that information. It will be appreciated that it is possible to have different references designating the same object implementation through different interfaces.

An object in some embodiments is an implementation of an interface within some service and is an independent unit of failure. An object may be expressed and coded in any programming language capable of passing parameters and control.

An object reference in some embodiments identifies the object to which the reference refers and is not able to be forged. A reference confers to the holder the authority to invoke any of the methods of the interface for which the reference to the object was created. An object reference may be revoked and may be passed (optionally with restrictions) to another service or to other services as an argument of an invocation or as return results.

Use of an interface so defined enables the definition of a class implementing the interface and whose method implementations are stubs which perform the task of parameter marshalling. Instances of such a class are herein referred to as proxies, the proxies sitting in for the actual objects to which they refer and having the same interface.

In accordance with some embodiments of the invention, when a service, agent or process (e.g., a first process) wants to make an object available to another process (e.g., a second service, agent or process), instead of invoking a trusted entity to register the object reference for export from the first process, the trusted entity recognizes that a new object reference is being exported by the first process by monitoring communications between processes and inspecting the reference name. The trusted entity automatically creates an entry for the object reference in a table maintained for the first process when a reference to the object is exported. In some embodiments, the trusted entity recognizes that the object reference is a reference which has been exported by the first process because of the naming convention used to name the object reference. In some embodiments of the invention, object references owned by the passing process are identified by naming the reference an even number (e.g., giving the object reference a name which is an even number, such as naming the object reference "2").

A reference that is passed to a process (that is, is passed to the second process by the first process but is not owned by the first process) may also be referred to as "foreign" reference. An object reference being passed to the second process by the first process (foreign to both the first and the second process) is identified by naming the object reference an odd number. It will be appreciated that there are numerous other naming conventions that would enable the trusted entity to distinguish exported references from foreign or passed references. For example, foreign references may be named with a standard prefix which identifies the reference as a foreign reference. A name that contains or begins with or ends with a particular character or series of characters such as "0", "1", "FOR", etc. may identify the reference as foreign, while a name that contains or begins with or ends with a particular character or series of characters such as "1", "0", "EXP", etc. may identify the reference as exported (owned by the process sending the message).

Upon recognizing the reference to be a new exported reference, the trusted entity may create an entry in a table for the exporting process (the first process) for the reference. The trusted entity may also create an entry in a table for the process to which the reference is being exported, wherein the index to the table entry identifies the reference as one foreign to the second process and may pass this index to the table entry to the second process.

Thus, in an exemplary IPC system according to some embodiments of the invention, when a first process (process B), wants to export an object reference (i.e., make the referenced object owned by the first process available to a second process (process A)), the first process identifies the object reference as exported. In some embodiments of the invention, the reference is identified as exported by assigning the reference a name which is an unused even integer. A trusted entity that mediates or monitors communications between processes recognizes that the reference in the communication is exported, because the reference name is an even integer. If the reference is a new reference, the trusted entity creates an entry in a table maintained for process B. If a reference to the object is to be exported or passed to the second process (process A), the trusted entity generates a new name or index for the object reference in a second table maintained for process A. The name or index the trusted entity generates in some embodiments of the invention identifies the object reference as one which is passed to process A but is not owned by process A, by making the name or index into the table maintained for process A an odd integer. The trusted entity may then provide process A with an object reference which is the odd integer that is the index of the entry in process A's table corresponding to the reference.

Figure 3:
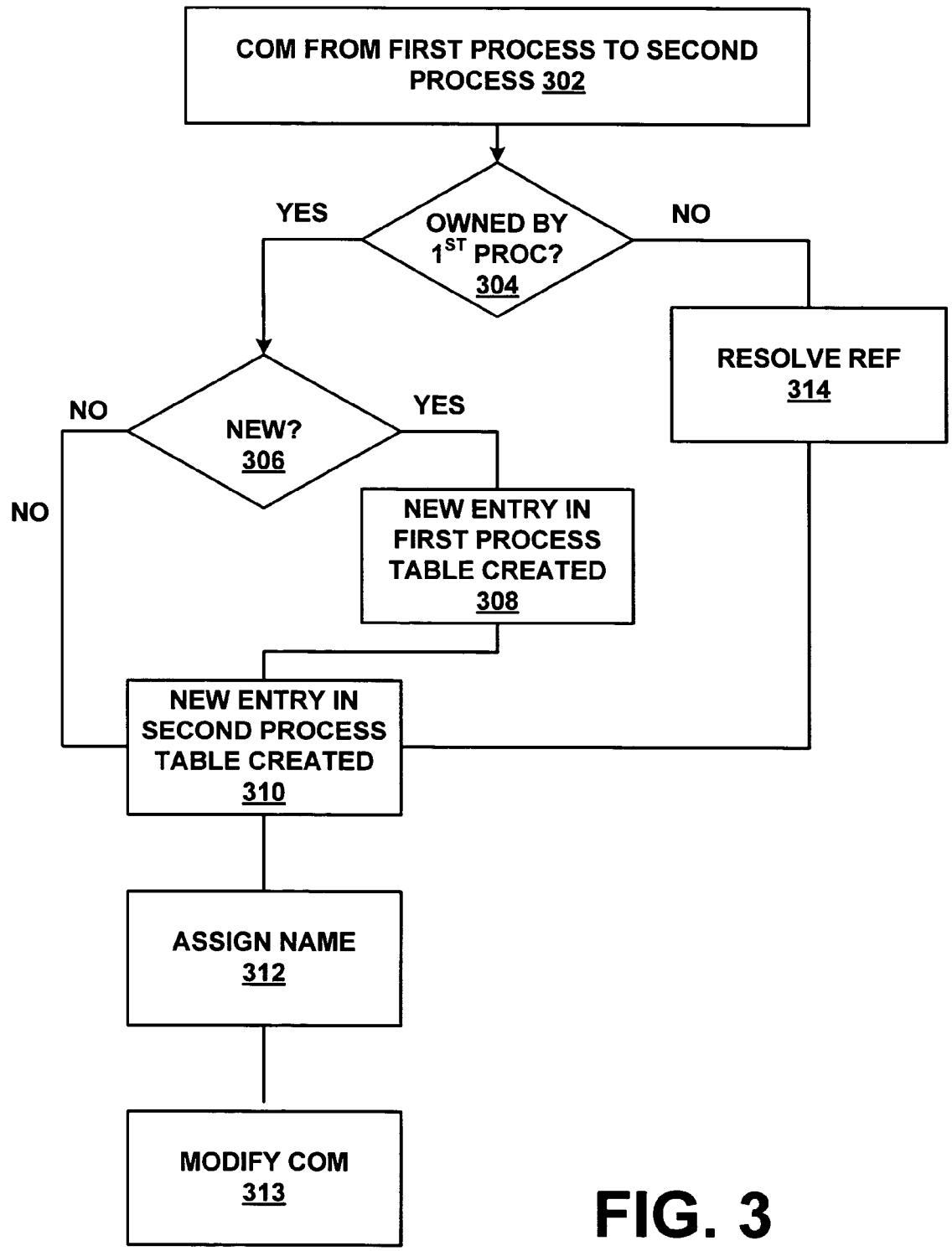
FIG. 3 is a flow diagram of an exemplary method for self-registering objects in accordance with one embodiment of the invention.

FIG. 3 illustrates an exemplary process for self-registering objects in accordance with some embodiments of the invention. It will be appreciated that the sequence of the actions may be optional. For example, creating a new entry in the second process table (310) may precede or follow assigning a new name to a reference (312), etc. At 302 a decision may be made to send a communication from a first process to a second process. The communication may be intended to make an object owned by the first process accessible to the second process or the communication may be intended to make an object owned by another process accessible to the second process. The communication may be sent from the first process to a second process and may be mediated by a trusted entity, or the communication may be sent from the first process to a trusted entity for forwarding to the second process. The communication may include one or more of: the originating process, the receiving process and an object reference, a location at which the referenced object resides in the owning process, etc.

At 304 the trusted entity may determine whether the reference is a reference to an object or resource owned by the first process or if the reference is a reference to an object or resource owned by another process. If the communication includes a reference to an object that is owned by the first process which is being exported by the first process to the second process, the trusted entity may determine if the reference has previously been exported (306). If the object reference has not previously been exported, an entry may be created in the table for the first process (308). At 310 a new table entry may be created in the table for the second process. The object reference may be identified as a reference that is foreign to the second process (not owned by the second process) (312) by assigning the reference a new name. The new name (a local name for the reference for the second process) may be associated in the second process' table with the name of the reference used internally in the first process. At 313 the communication may be modified to include the new local name before the communication is sent on to the second process A.

If the object reference has been previously exported to any process, a table entry for the first process will already exist and therefore only the table entry for the second process will be generated, as described above (310).

If at 304 the object reference in the communication is identified as foreign to the first process (not owned by the first process), the trusted entity resolves the foreign reference in the first process' table to the internal name of the reference used by the process that owns the object at 314. Resolution of references may be implemented by consulting table entries as described more fully below with respect to the examples. Processing continues at 310 at which the trusted entity may create a new local name for the second process and may associate with it the internal name of the reference used by the process that owns the object at 312 and may generate a table entry for the second process as described above.

Figure 4:
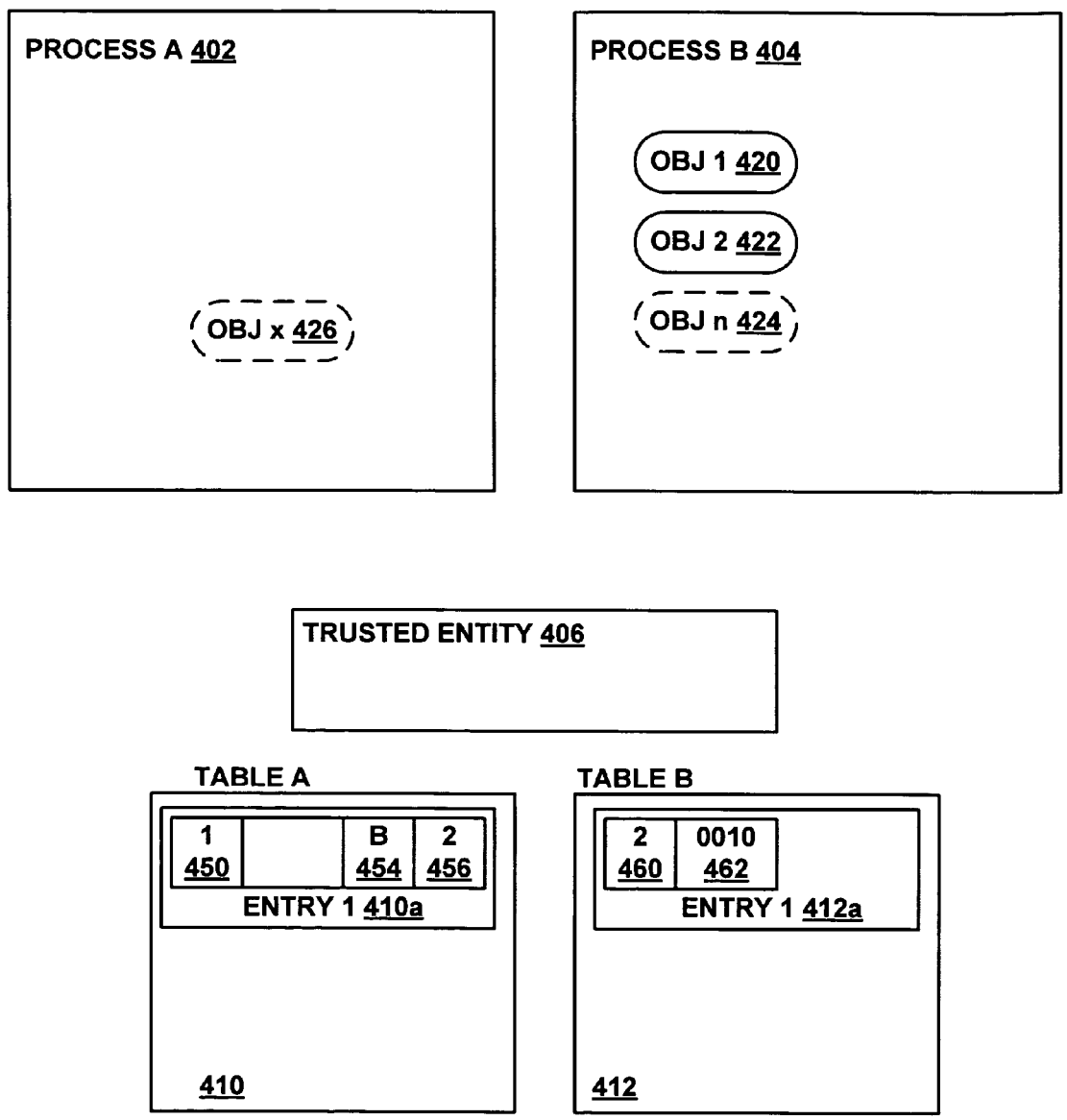
FIG. 4 is a block diagram of an exemplary system for self-registering objects in accordance with one embodiment of the invention.

A system for self-registering objects may include one or more processes, entities, agents or services including one or more objects or resources that may be shared with one or more other processes, agents or services. The system may also include one or more tables for storing information about shared objects or resources, and/or an independent entity, process, service or agent that mediates communications between processes, entities, agents or services. FIG. 4 is a block diagram of an exemplary system for self-registering objects in accordance with one embodiment of the invention. In FIG. 4, trusted entity 406 mediates communications between processes such as those between process A 402 and process B 404 and vice versa. In some embodiments of the invention, trusted entity 406 is the kernel of an operating system, such as but not limited to the one described with respect to FIG. 2. The trusted entity 406 may be viewed as a unique distinctive process, agent or service within the IPC system. In some embodiments trusted entity 406 is able to distinguish between data parameters and reference parameters within communications. In some embodiments the trusted entity 406 has a trusted channel to every agent, service or process for mediating resource access and reference and therefore communications with the trusted entity 406 are secure, meaning that processes other than the trusted entity 406 are unable to access or modify the transmissions. Moreover, the trusted entity 406 may be capable of identifying the originator of a message.

Still referring to FIG. 4, process A 402 and process B 404 may reside on the same computer or on different computers within a computer network. It will be appreciated that although FIG. 4 illustrates only two processes in addition to the trusted entity 406, the invention as contemplated is not so limited. That is, a system for self-registering objects may include any number of processes.

Process A 402 and process B 404 may include one or more objects (representing resources that may be able to be shared with other processes). In FIG. 4, process B 404 as illustrated includes object 1 420, object 2 422 ... object n 424. Similarly, process A 402 as illustrated in FIG. 4 includes exemplary object x 426, although it will be appreciated that process A 402 and process B 404 may include any number of objects. Process A 402 may export a reference to one or more of its objects (e.g., a reference to object x 426) to other processes (e.g., to process B 404). Similarly, process B 404 may export a reference to one or more of its objects (e.g., a reference to one or more of objects: object 1 420, object 2, 422 ... object n 424) to other processes (e.g., to process A 402, or to another process such as process C (not shown)). Process A 402 may pass a reference to an object that has been exported to it (such as, for example, a reference to one or more of objects object 1 420, object2 422 ... object n 424) exported to it by other processes (such as, for example, by process B 404). Similarly, process B 404 may pass a reference to an object (such as, for example, object x 426) exported to it or passed to it by other processes (such as, for example, by process A 402). A process that exports or passes an object reference may be referred to as an originating process. A process that receives a reference may be referred to as a receiving process.

A process such as but not limited to process A 402 may identify a reference to an object it owns that it is exporting to another process by labeling, naming, referring to or otherwise identifying the object reference in such a way that an exported object reference is distinguishable from a reference to an object that process A 402 does not own that it is passing to another process. For example, for process B to export object 1 420 to process A, process B may assign an unused even number to object 1 420 to be used as the object reference in the IPC communication. Similarly, for process A 402 to export object x 426 to process B 404, process A 402 may assign an unused even number to object x 426 to be used as the object reference in the IPC communication.

The trusted entity 406 mediates communications between processes and may maintain a table of exported object references for each process. The table may also include references passed to the process from another process. The communication received by the trusted entity 406 may include an object reference. The trusted entity 406 may determine if the reference in the communication is to be exported or passed. If the trusted entity 406 determines that the object reference in the communication is to be exported, the trusted entity 406 may then determine if the object reference has previously been exported, by searching for that object reference in the originating (exporting) process's table. If the object has not been previously exported, no entry for the object will be found, and the trusted entity will create an entry for the object reference. If the object reference has been previously exported, an object reference will already exist in the table for that process. A duplicate entry for the reference will not be created. The trusted entity 406 may then pass a reference to the object exported by the originating process to the receiving process, identifying the reference as an foreign reference (that is, foreign to the receiving process) by assigning an odd number as an object reference. The trusted entity 406 may add an entry to the table for the receiving process for the foreign reference.

In some embodiments of the invention, a table is maintained by the trusted entity 406 for each process (e.g., process A 402 and process B 404 of FIG. 4). Table 410 of FIG. 4 illustrates an exemplary table that trusted entity 406 maintains for process A 402. Table 412 illustrates an exemplary table that trusted entity 406 maintains for process B 404. Tables maintained by the trusted entity may include one or more of the following for each object in the table: an index or name (even integer indicates the reference is exported, odd integer indicates the reference is a foreign reference), a location of the object in the originating process, the process to which the reference was exported or from which the reference was passed, a cross-reference to the reference name used by the originating process as well as other information. For example, in FIG. 4, entry 1 410a includes the index "1" 450 which indicates that the reference is a foreign reference (is not owned by process A 402) because the index is odd, the location 452 of the object in process B 404, the name of the process that exported the reference, process B, 454 and the reference name used by process B 404 ("2" 456). Similarly, as illustrated in FIG. 4, entry 1 412a of table B 412 may include the index "2" 460 which indicates that the object to which the reference refers is owned by process B 404 because the index is even, and the location 462 of the object in process B 404.

For example, referring now to FIG. 3 and FIG. 4, suppose process B 404 (the first process) wants to make object 1 420 accessible to process A 402 (the second process). Process B 404 at 302 may send a communication to process A 402 to notify process A 402 that object 1 420 may be accessed by process A 402. An exemplary communication may include process B 404 (the originating process), process A 402 (the receiving process) and the internal name used by process B to reference object 1 420 (i.e., "2" 460). At 304, trusted entity 406, in some embodiments, ascertains if object 1 420 is owned by process B 404. In some embodiments of the invention, the trusted entity 406 can determine that object 1 420 is owned by process B 404 by inspection of the name of the reference. As the name of the reference is an even integer ((i.e., "2" 460), the trusted entity 406 may determine that object 1 420 is owned by process B. Because "2" is an even integer and because the communication is sent by process B 404 to process A 402, the trusted entity 406 understands that process B 404 wants to export object 1 420 to process A 402 (308). As process B 404 is the owner of object 1 420, at 306, the trusted entity 406 next may determine whether process B 404 has already exported object 1 420. If a reference to object 1 420 has already been exported, a table entry 1 412a will already exist in table B 412 for the reference to object 1 420. The trusted entity 406 searches in the table 412 that trusted entity 406 maintains for process B 404 for an entry index "2". Finding an index "2" in the table B 412 indicates that this object has already been exported. In that case, a new table entry is not created in table B 412. The trusted entity 406 assigns a new name to the reference (i.e., "1" 450) at 312 and generates a table entry in table A 410 for process A 402 (entry 1 410a) at 310.

If, however, this is the first time that a reference to object 1 420 is being exported, no entry for the reference will exist in table B 412. Suppose no index "2" is found. Failure to find an index "2" indicates that this object has not been exported already (i.e., the object reference being exported is "new" (306). In that case, the trusted entity 406 will create a new table entry 1 412a in table B 412 for the reference 2 460. The table entry may also include one or more of the following: the location of object 1 420 in process B 404 ("0010" 462), the name of the process to which the reference was exported (process A) and a cross-reference to the name used by process A 402 to refer to the reference ("1").

Figure 5:
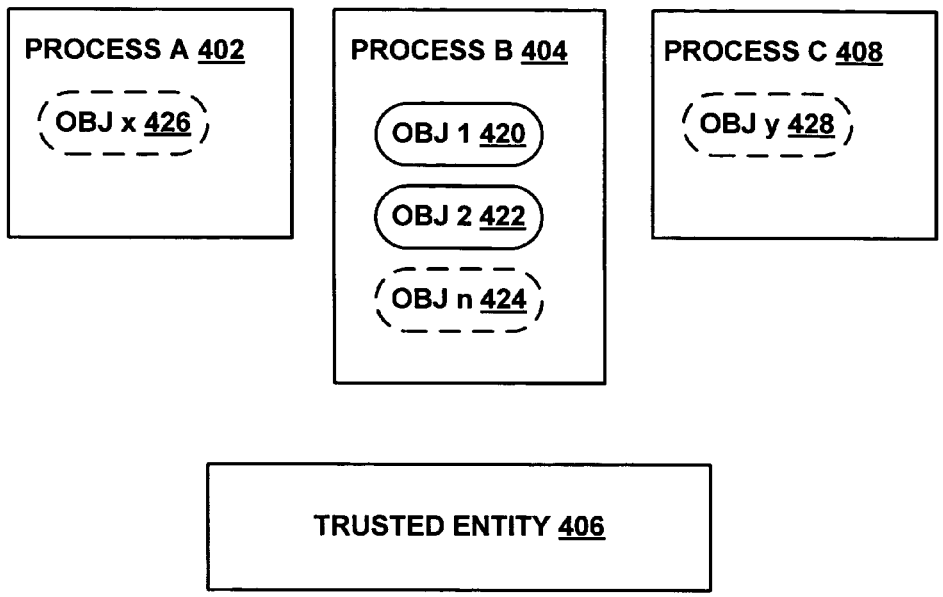
FIG. 5 is a block diagram of another exemplary system for self-registering objects in accordance with one embodiment of the invention.

FIG. 5 is a block diagram of another exemplary system for self-registering objects including a third process, process C 408. Suppose that process C 408 owns an object, object y 428. Suppose the internal name which process C 408 uses to reference object y 428 is "4" (an even integer indicating that process C 408 owns object y 428). Suppose further that the communication which process B 404 sends to process A 402 is sending a reference to object y 428. Suppose that the name assigned to the reference to object y 428 used by process B 404 is "17" 480. When process C 408 exported a reference to object y 428 to process B 404, a table entry in table B 412 (table entry 2 412b) would have been created. Suppose the table entry included the name used for the reference by process B ("17" 480) and the name process C 408 uses to refer to object y 428 ("4", 486). At 304, the trusted entity will determine that the object referenced in the communication (object y 428) is not owned by process B 404 because the name process B 404 uses for the reference is an odd integer ("17" 480). At 314, the trusted entity may resolve the reference to object y 428. To resolve the reference, the trusted entity translates the name that process B 404 uses to reference object y 428 (i.e., from table entry 2 412*b*, "17" 480) to the name used by process C 408 ("4" 486). It will be appreciated that process C 408 will also have a table (table C 414) with a table entry 1 414*a* having process C's internal name for the object reference ("4" 470 and a location of the object in process C ("0030" 472). The trusted entity 406 then assigns a new name to the reference ("19" 490) and generates a new table entry in table A 410 for the reference (entry 2 410*b* including "19", process A's name for the reference 490 and "4" process C's name for the reference 496).

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A computer system, comprising:
   a processor coupled to a computer-readable storage medium, the computer readable storage medium including:
   instructions for executing an operating system, the operating system having a kernel, wherein the kernel includes instructions for maintaining a table for a first process and a table for a second process, wherein the kernel is solely able to access the table for the first process and the table for the second process;
   instructions for configuring an inter-process communication channel between the first process and the second process;
   instructions for sending, by the first process, a reference to an object controlled by the first process to the second process via the inter-process communication channel, wherein the object includes a method operation;
   instructions for detecting, by the kernel that the first process exported the reference interface to an object to the second process by monitoring information sent via the inter-process communication channel and determining that the reference to the object was sent;
   instructions for determining, by the kernel, that the reference for the object has not been previously exported to the second process by searching the table for the second process;
   instructions for generating, in response to determining that the reference for the object has not been previously exported to the second process, a local name for the reference for the object and associating the local name for the reference for the object with a name for the object;
   instructions for generating, by the kernel, an entry in the table for the second process, the entry including information that identifies that the object is foreign to the second process and local to the first process, the local name for the reference for the object and the name for the object; and
   instructions for making, by the kernel, the local name for the reference for the object table available to the second process.

2. The system of claim 1, wherein the kernel includes instructions for determining that the object is owned by the first process.

3. The system of claim 1, wherein the kernel includes instructions for generating a local name for the object for use by the second process according to a naming convention that distinguishes between an object that is owned by the second process and an object that is not owned by the second process.

4. The system of claim 2, wherein the kernel is solely able to access a namespace of objects for the first process.

5. The system of claim 1, wherein the kernel is solely able to access a namespace of references for the second process.

6. A computer-implemented method for self-registering resources in an inter-process communication mechanism comprising:
   maintaining, by a kernel, a table for a first process, a table for a second process, and a table for a third process, wherein the kernel is solely able to access the table for the first process, the table for the second process and the table for the third process;
   establishing an inter-process communication channel between the first process and the second process;
   detecting, by the kernel, that the first process exported a first process local name for a resource to an object controlled by the third process to the second process by monitoring information sent via the inter-process communication channel, the object including a method operation;
   determining, by the kernel, that the resource for the object controlled by the third process has not been previously exported to the second process by searching the table for the second process and in response to determining that the resource for the object controlled by the third process has not been previously exported to the second process:
   determining, by the kernel, that the resource is controlled by the third process and generating a second process local name for the resource;
   generating, by the kernel, an entry in the table for the second process, the entry including information that identifies that the object is foreign to the second process, local to the third process, and the second process local name for the resource; and
   sending, by the kernel, a signal to the second process, the signal indicating that the table has been updated and including the second process local name for the resource.

7. The method of claim 6, further comprising:
generating an entry in the table for the third process, the entry indicating that the third process owns the object.

8. The method of claim 7, further comprising:
generating a local name for the object for use by the second process according to a naming convention that distinguishes between an object that is owned by the second process and an object that is not owned by the second process.

9. The method of claim 8, further comprising:
storing the local name in the table for the second process.

10. A computer-readable storage medium comprising computer-executable instructions for:
maintaining, by a kernel, a table for a first process, a table for a second process, and a table for a third process, wherein the kernel is solely able to access the table for the first process, the table for the second process and the table for the third process;
establishing an inter-process communication channel between the first process and the second process;
detecting, by the kernel, that the first process exported a first process local name for a resource to an object controlled by the third process to the second process by monitoring information sent via the inter-process communication channel, the object including a method operation;
determining, by the kernel, that the resource for the object controlled by the third process has not been previously exported to the second process by searching the table for the second process and in response to determining that the resource for the object controlled by the third process has not been previously exported to the second process:
determining, by the kernel, that the resource is controlled by the third process and generating a second process local name for the resource;
generating, by the kernel, an entry in the table for the second process, the entry including information that identifies that the object is foreign to the second process, local to the third process, and the second process local name for the resource; and
sending, by the kernel, a signal to the second process, the signal indicating that the table has been updated and including the second process local name for the resource.

11. The computer-readable storage medium of claim 10, comprising further computer-executable instructions for:
determining, by the kernel that the object is owned by the third process.

12. The computer-readable storage medium of claim 11, comprising further computer-executable instructions for:
generating, by the kernel, a local name for the object for use by the second process according to a naming convention that distinguishes between an object that is owned by the second process and an object that is not owned by the second process.

13. The computer-readable storage medium of claim 10, comprising further computer-executable instructions for:
determining, by the kernel, that the object is owned by the third process by inspection of the table entry associated with the object, wherein the table entry is assigned according to a naming convention that distinguishes between an object owned by the third process and a resource not owned by the third process.

14. The computer-readable storage medium of claim 13, comprising further computer-executable instructions for:
generating, by the kernel, a new entry in a namespace maintained for the second process in response to determining that the object is owned by the third process, the new entry comprising the second process local reference interface for the object.

15. The computer-readable storage medium of claim 14, comprising further computer-executable instructions for:
determining that the resource for the object controlled by the third process has not been previously exported to the second process by searching the table for the second process, wherein the reference for the object controlled by the third process has previously been exported if an entry is found in the namespace.

16. The computer-readable storage medium of claim 10, comprising further computer-executable instructions for:
preventing access to a namespace maintained for the first process by the first process and the second process.

17. The computer-readable storage medium of claim 10, comprising further computer-executable instructions for:
preventing access to a namespace maintained for the second process by the first process and the second process.

* * * * *

UNITED STATES PATENT AND TRADEMARK OFFICE
CERTIFICATE OF CORRECTION

| | | |
|---|---|---|
| PATENT NO. | : 7,730,522 B2 | Page 1 of 1 |
| APPLICATION NO. | : 11/130301 | |
| DATED | : June 1, 2010 | |
| INVENTOR(S) | : Jose M. Bernabeu-Auban et al. | |

It is certified that error appears in the above-identified patent and that said Letters Patent is hereby corrected as shown below:

Cover page, item (75), under "Inventors" column 1, line 1, delete "Jose M. Bernabeu-Aubon," and insert -- Jose M. Bernabeu-Auban, --, therefor.

In column 18, line 2, in Claim 11, delete "comprising further" and insert -- further comprising --, therefor.

In column 18, line 6, in Claim 12, delete "comprising further" and insert -- further comprising --, therefor.

In column 18, line 13, in Claim 13, delete "compnsing further" and insert -- further comprising --, therefor.

In column 18, line 21, in Claim 14, delete "comprising further" and insert -- further comprising --, therefor.

In column 18, line 28, in Claim 15, delete "comprising further" and insert -- further comprising --, therefor.

In column 18, line 36, in Claim 16, delete "comprising further" and insert -- further comprising --, therefor.

In column 18, line 40, in Claim 17, delete "comprising further" and insert -- further comprising --, therefor.

Signed and Sealed this
First Day of February, 2011

David J. Kappos
*Director of the United States Patent and Trademark Office*